United States Patent [19]
Rapp et al.

[11] Patent Number: 5,616,525
[45] Date of Patent: Apr. 1, 1997

[54] IRREGULARLY SHAPED GLASS FIBERS AND INSULATION THEREFROM

[75] Inventors: Charles F. Rapp, Newark; Russell M. Potter, Hebron, both of Ohio

[73] Assignee: Owens-Corning Fiberglas Technology, Inc., Summit, Ill.

[21] Appl. No.: 639,643

[22] Filed: Apr. 29, 1996

Related U.S. Application Data

[63] Continuation-in-part of Ser. No. 434,699, May 4, 1995, abandoned.

[51] Int. Cl.$^6$ ............ C03C 13/06; C03C 3/085; C03C 3/093

[52] U.S. Cl. ............ 501/35; 501/36; 501/16; 501/65; 501/66; 501/67; 501/69; 501/70

[58] Field of Search ............ 501/35, 36, 16, 501/65, 66, 67, 69, 70, 17, 20

*Primary Examiner*—Mark L. Bell
*Assistant Examiner*—Louis M. Troilo
*Attorney, Agent, or Firm*—C. Michael Gegenheimer; Curtis B. Brueske; Linda S. Evans

[57] ABSTRACT

Irregularly shaped glass fibers and insulation therefrom comprise two different glasses having differing coefficients of thermal expansion. The irregularly shaped dual-glass fibers are made from wool glass compositions with the addition of at least one of BaO, SrO, $K_2O$, $Li_2O$, ZnO, $TiO_2$ and $Fe_2O_3$.

16 Claims, 4 Drawing Sheets

5,616,525

IRREGULARLY SHAPED GLASS FIBERS AND INSULATION THEREFROM

CROSS REFERENCE TO RELATED APPLICATION

This is a continuation-in-part of U.S. Ser. No. 08/434,699, filed May 4, 1995 now abandoned.

TECHNICAL FIELD OF THE INVENTION

This invention relates to irregularly shaped glass fibers suitable for insulation. Each glass fiber comprises two distinct glasses.

BACKGROUND OF THE INVENTION

Glass fibers, mineral fibers and other wool materials have been insulating buildings for some time. Insulation easily fits into the spaces in attics, ceilings, walls, floors and the like.

The common prior art methods for producing glass fiber insulation products involve producing glass fibers from a rotary process. A single molten glass composition is forced through the orifices in the outer wall of a centrifuge or spinner, producing primarily straight glass fibers. The fibers are drawn downward by a blower. The binder required to bond the fibers into a wool product is sprayed onto the fibers as they are drawn downward. The fibers are then collected and formed into a wool pack.

Recent developments include insulation which installs rapidly and effectively between the studs of a building. An exterior layer covers the fibrous batt. Preferably, the exterior layer covering comprises a polyethylene package which receives the fibrous batt. Another focal point of recent developments in insulation is one in which all the binder or essentially all the binder is no longer present in the fibrous batt. Evolution of processes for producing low density insulation provides satisfactory resiliency without a binder in the batt.

Still other developments are insulations of mineral fibers which are irregular in shape. Fibers that are irregular, rather than straight, kinked or even curly, provide a more uniform lattice structure. This uniform volume filling allows for higher recovery ratios. More importantly, uniform volume filling also results in significantly lower thermal conductivity. Also, the greater entanglement of irregularly shaped fibers provides better wool pack integrity. By sufficient integrity, it is meant that the fibers of the wool batt will remain entangled and not separate.

SUMMARY OF THE INVENTION

The present invention provides irregularly shaped glass fibers suitable for insulation. Each glass fiber comprises two distinct glasses. Each glass has a different coefficient of thermal expansion (CTE) differing by at least 2.0 ppm/C. Each glass has a different composition. Each glass composition has a log viscosity of 3 at a temperature ranging from 1600 to 2050 F. (982 to 1121 C.) and a liquidus temperature at least 50 F. (28 C.) below the temperature for a log viscosity of 3, and each glass composition consists essentially of $SiO_2$, $Al_2O_3$, and $Na_2O$, and includes at least one of BaO, SrO, $K_2O$, $Li_2O$, ZnO, $TiO_2$ or $Fe_2O_3$. Preferably, the glasses also include $B_2O_3$, MgO or CaO. Preferably, each glass composition has a liquidus temperature at least 150° F below the temperature for a log viscosity of 3 and the CTE's differ by at least 4.0 ppm/C. Preferably, the glass compositions include at least one of BaO, $K_2O$, $Li_2O$ and ZnO.

Each glass composition includes 1.0 to 20.0 mole percent of BaO, SrO, $K_2O$, $Li_2O$, ZnO, $TiO_2$ or $Fe_2O_3$. Preferably, each glass composition includes 2.0 to 10.0 mole percent of one or more of these ingredients.

Two glasses are being used in fiber forming from wool glass components and compositions. Adjustments were made in the $B_2O_3$ and $Na_2O$ content to give a large difference in the coefficient of thermal expansion while maintaining the same fiber forming temperature. This approach gave the desired properties but approached the limits of acceptable compositions. The present invention is directed at increasing the number of components in the glass to expand the compositional region and properties possible for these glasses.

PREFERRED EMBODIMENTS OF THE INVENTION

In general, insulation products comprising irregularly shaped glass fibers according to this invention can be made using suitable means and methods, such as those described and shown in U.S. Pat. No. 5,431,992 to Houpt et al., the disclosure of which is incorporated by reference herein.

Preferably, fibers in accordance with the invention are made by the direct-forming method described in International Publication No. WO 95/30787 and U.S. Ser. No. 08/240,428 to Scott et al., filed May 10, 1994 (see especially FIG. 1 thereof), the disclosures of which are also incorporated by reference. After the fibers are formed, they may be stored for shipment, e.g., to composters (before or after chopping), or further processed as appropriate for the desired end use. For example, if the fibers are to be used to prepare insulation, they may be encapsulated, chopped and then rolled using appropriate means known in the art.

Figure 1:
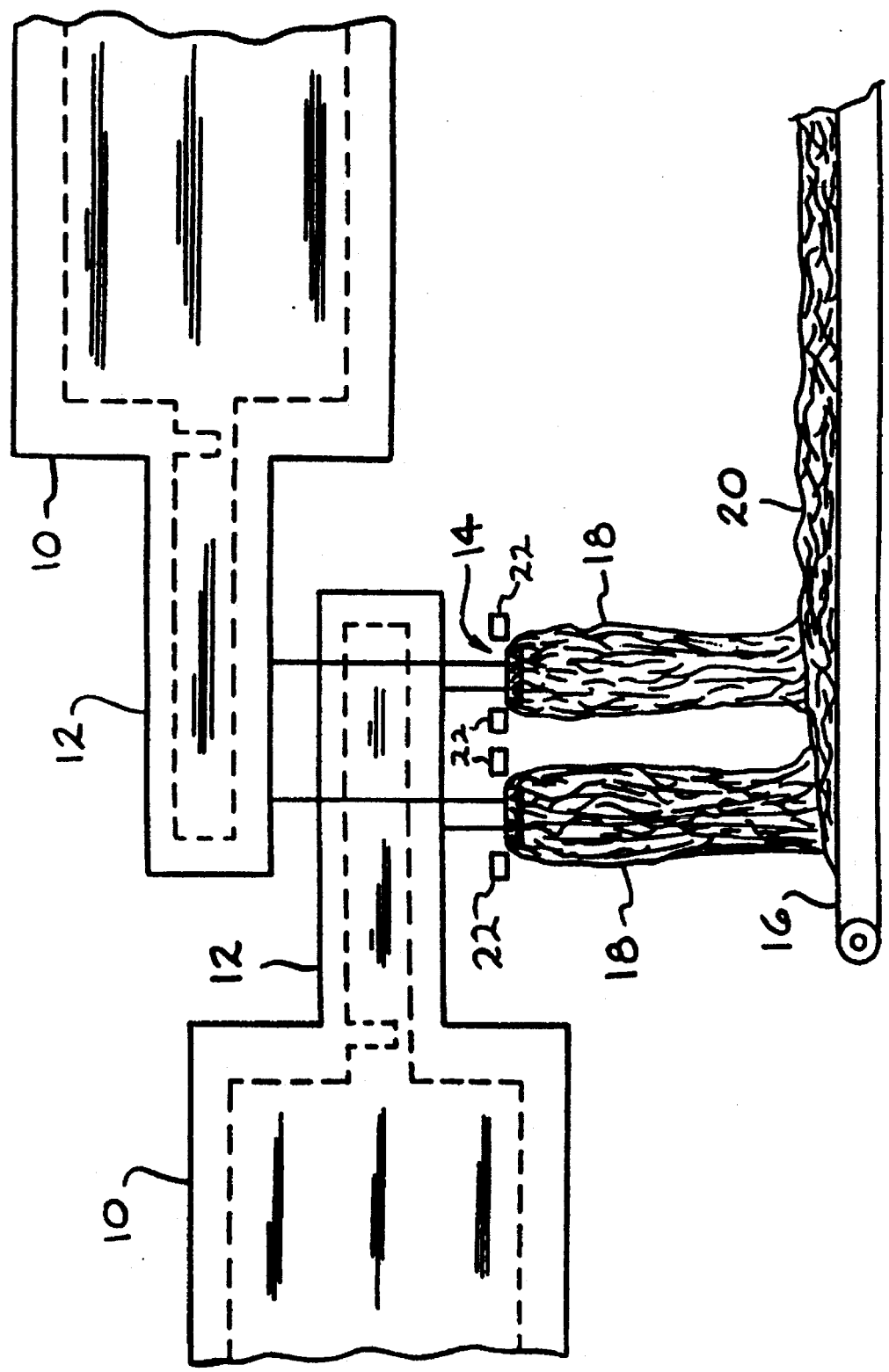
FIG. 1 is a view of a process by which the insulation of the present invention may be produced.

Alternatively, insulation products of irregularly shaped glass fibers of the present invention can be produced from a rotary fiber forming process as shown in FIG. 1 herein. Referring to FIG. 1, furnaces 10 supply two distinct molten glass compositions via forehearths 12 to fiberizers 14. Veils of irregularly shaped glass fibers 18 produced by the fiberizers are collected on conveyor 16 as wool pack 20 by means of a vacuum positioned beneath the conveyor. As the fibers are blown downward by air or gases to the conveyor by means of blowers 22 in the fiberizers, they are attenuated and assume their irregular shape.

Figure 2:
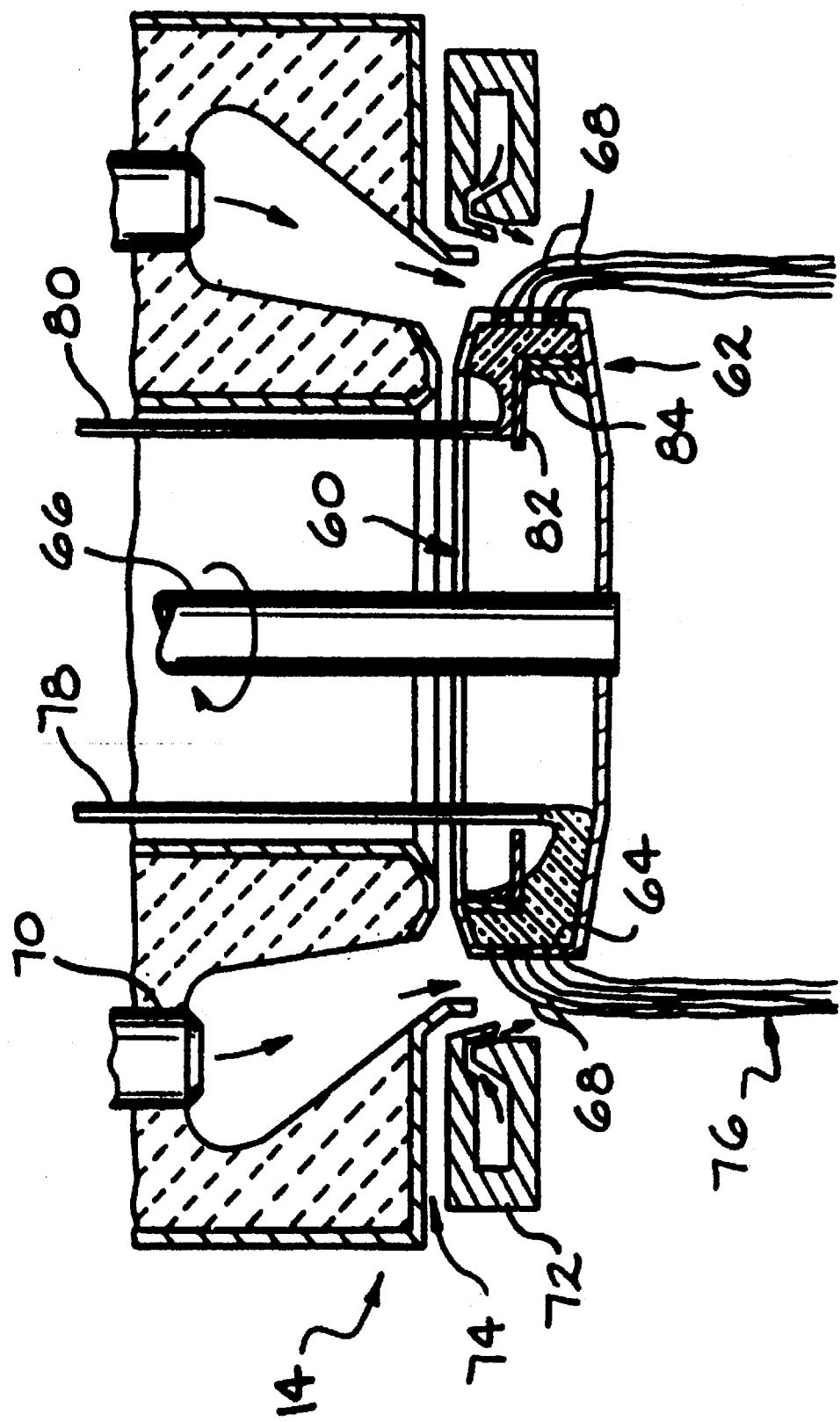
FIG. 2 is a view of a fiberizer by which the fibers of the present invention may be produced.

FIG. 2 shows that fiberizers 14 include spinners 60. Spinner 60 is comprised of spinner bottom wall 62 and spinner peripheral wall 64. Spindle 66 rotates spinner 60. The rotation of the spinner centrifuges molten glass through the spinner peripheral wall into primary fibers 68. The primary fibers are maintained in soft, attenuable condition by the heat of annular burner 70. In one embodiment of manufacturing fibers according to the invention, an internal burner (not shown) provides heat to the interior of the spinner. Annular blower 72, using induced air 74, pulls the primary fibers and further attenuates them into secondary fibers 76, suitable for use in wool insulating materials. The secondary fibers, or bi-component glass fibers, are then collected for formation into a wool pack.

The interior of the spinner is supplied with two separate streams of molten glass, first stream 78 containing glass A and second stream 80 containing glass B. The glass in stream 78 drops directly onto the spinner bottom wall and flows outwardly with centrifugal force toward the spinner peripheral wall to form a head of glass A. Glass B in molten glass stream 80 is positioned closer to the spinner peripheral wall than stream 78, and the glass in stream 80 is intercepted by horizontal flange 82 before it can reach the spinner bottom wall. Thus, a build-up or head of glass B is formed on the horizontal flange.

Figure 3:
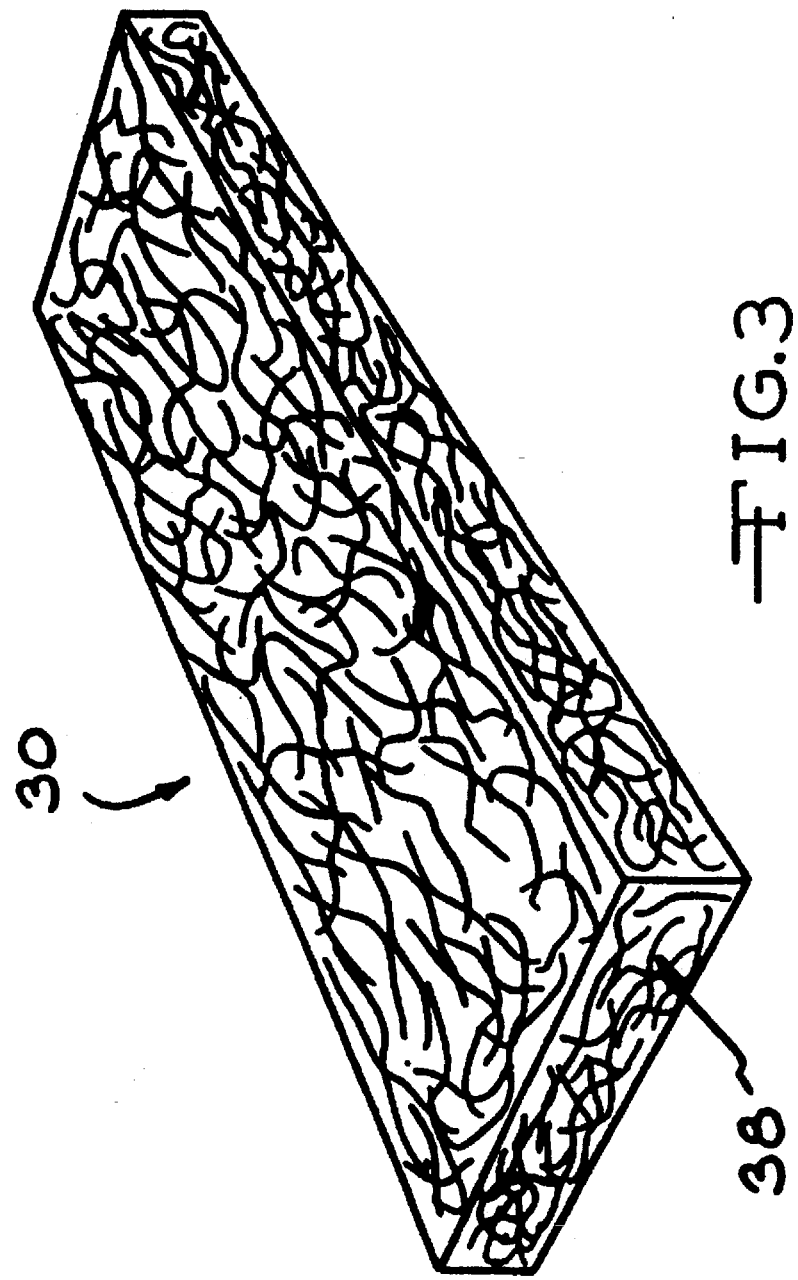
FIG. 3 is a view of insulation showing entangled, irregularly shaped fibers of the invention.

FIG. 3 shows insulation product 30 comprised of entangled, irregularly shaped glass fibers 38.

Figure 4:
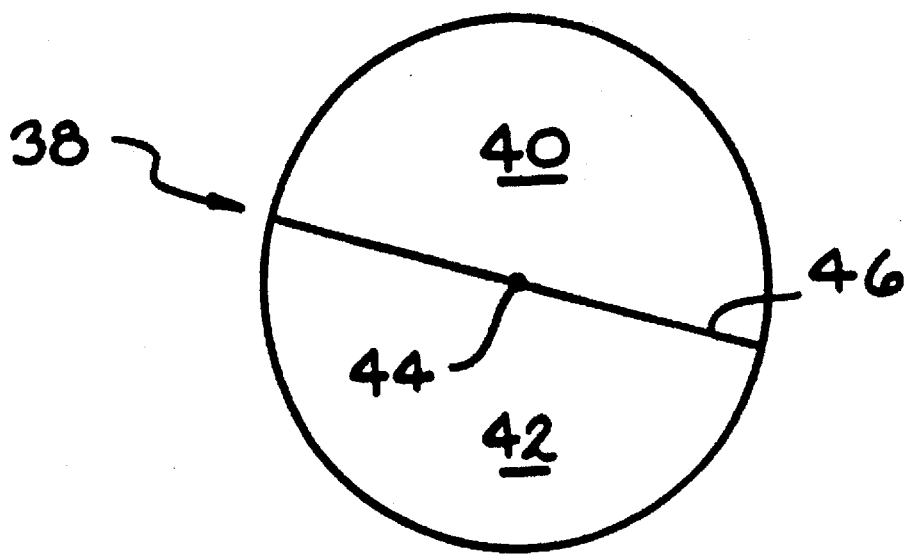
FIG. 4 is a cross-sectional view of an irregularly shaped fiber of the invention having a 50:50 A/B glass ratio.

FIG. 4 is a cross-sectional view of an ideal irregularly shaped glass fiber 38 having a 50:50 A/B glass ratio. Halves 40 and 42 essentially are equal in the ideal, with point 44 being the center and line 46 being the diameter.

Figure 5:
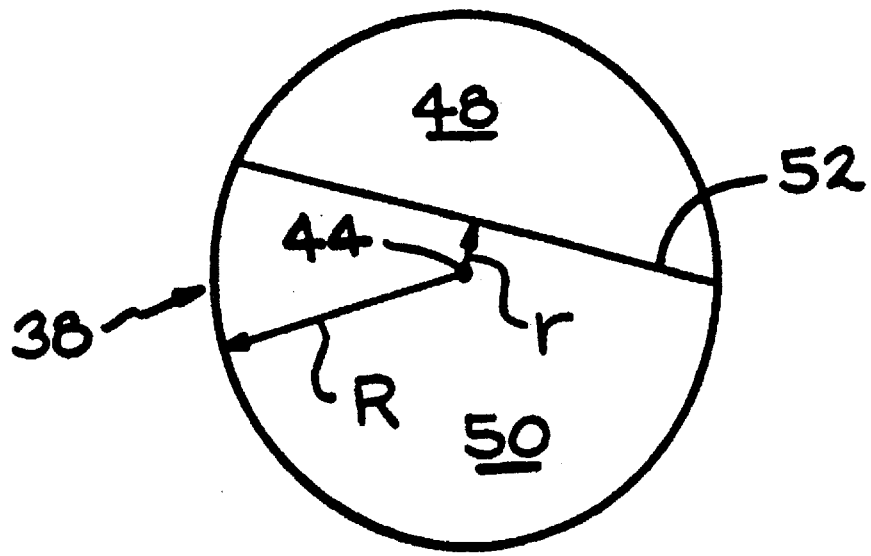
FIG. 5 is a view of an irregularly shaped fiber having an A/B glass ratio of less than 50:50.

FIG. 5 shows a more typical cross-section where halves 48 and 50 are not equal. Line 52 is no longer a diameter, but just a divider. Lines R and r are shown to locate center point 44.

The deviation ratio is a measure of how far the A/B glass ratio is away from 50:50. The larger the deviation from 50:50, the larger r will be as a percent of R. It has been Found that the average deviation ratio of the irregularly shaped glass fibers of the invention is typically greater than about 5%, generally greater than about 15%, and in many cases, greater than about 30%.

The irregularly shaped fibers of the present invention are preferably dual-glass fibers, i.e., each fiber is composed of two different glass compositions, glass A and glass B. If one were to make a cross-section of an ideal irregularly shaped glass fiber of the present invention, one half of the fiber would be glass A, with the other half glass B. In practice, a wide range of proportions of the amounts of glass A and glass B may exist in the various irregularly shaped glass fibers in the wool insulating material (or perhaps even over the length of an individual fiber). The percentage of glass A may vary within the range of from about 15 to about 85% of the total glass in each of the irregularly shaped glass fibers, with the balance of total glass being glass B. In general, insulation products of the irregularly shaped fibers will contain fibers of all different combinations of the percentages of glass A and glass B, including a small fraction of fibers that are single-component.

Cross-section photographs of fibers are obtained by mounting a bundle of fibers in epoxy, with the fibers oriented in parallel as much as possible. The epoxy plug is then cross-sectioned using a diamond saw blade, and one of the new surfaces is polished using various grinding media. The polished sample surface is then coated with a thin carbon layer to provide a conductive sample for analysis by scanning electron microscopy (SEM). The sample is then examined by SEM using a backscattered-electron detector, which displays variations in average atomic number as a variation in the gray scale. This analysis reveals the presence of two glasses by a darker and lighter region on the cross-section of the fiber, and shows the interface of the two glasses.

Due to a continuously changing attenuation environment, each irregularly shaped fiber is twisted in a unique way. No two fibers are exactly alike. The fiber's final shape is one with a baseline curvature due to the dual-glass nature, which is modified by the twisting, irregular rotation of the plane of curvature caused by the continuously changing attenuation environment. The fiber has a baseline curvature that is twisted through three dimensions. It is generally not helical. The fiber's irregular nature allows the irregularly shaped glass fibers to stand apart from one another and achieve a uniform volume-filling nature.

While we do not wish to be limited to these, conventional glass compositions, which are suited for insulations, are the soda (or alkaline metal oxide) calcia (or alkaline earth metal oxide) aluminoborosilicate compositions. The constituents in the glass which are of main interest are: $SiO_2$, which is typically present in an amount of 50 to 68 percent by weight; $Al_2O_3$, typically present in amounts up to 9 percent by weight; $B_2O_3$, typically present in amounts up to 25 percent by weight; $Na_2O$, typically present in amounts of about 5 to 20 percent by weight; CaO, typically present in amounts of about 3 to 14 percent by weight; and MgO, typically present in amounts up to 10 percent by weight.

We found that substitutions can be made to modify the thermal expansion of glass pairs while minimizing differences in the viscosity and overall composition:

1. The molar substitutions of $Li_2O$ for $Na_2O$, and ZnO for CaO, decrease the CTE; and 2. The molar substitutions of $K_2O$ for $Na_2O$, and BaO for CaO +MgO, increase the CTE.

These would be in addition to modifications already being used such as the exchange of $Na_2O$ for $B_2O_3$.

These substitutions were made in a series of glasses based on $Na_2O$—$B_2O_3$—MgO—CaO—$SiO_2$ glasses suitable for producing bi-component glass fibers. Examples of the compositions are given in the following tables. The forming temperature (the temperature where the viscosity of the glass is about 1,000 poise), the liquidus temperature and the coefficient of thermal expansion are listed for several of the compositions. Coefficients of thermal expansion were either measured between 0 and 300 C. or between room temperature (21 C.) and 300 C.

EXAMPLE I

Irregularly shaped glass fibers of the present invention have the compositions shown below.

Controls #1C and #2C are known as $SiO_2$—$Al_2O_3$—$B_2O_3$—$Na_2O$—MgO—CaO glasses, which can be used to make bi-component irregularly shaped glass fibers.

| | Control Compositions, Mole % | |
|---|---|---|
| | #1C | #2C |
| $SiO_2$ | 52.65 | 62.54 |
| $Al_2O_3$ | 4.56 | 2.35 |
| $B_2O_3$ | 21.85 | 5.79 |
| $Li_2O$ | 0 | 0 |
| $Na_2O$ | 5.35 | 14.33 |
| $K_2O$ | 0 | 0.64 |
| MgO | 1.93 | 5.53 |
| CaO | 13.34 | 8.48 |
| SrO | 0.28 | 0.10 |
| BaO | 0 | 0.04 |
| ZnO | 0 | 0 |
| $TiO_2$ | 0.01 | 0.10 |
| $Fe_2O_3$ | 0.01 | 0.10 |
| CTE ($\times 10^{-6}$/C.) | 6.04 | 9.17 |
| Temperature (F.) for: | | |
| Log n = 3.0 | 1895 | 1919 |
| Liquidus | 1657 | 1730 |

Examples, Mole %

| Modification | #1<br>BaO | #2<br>BaO | #3<br>BaO | #4<br>BaO | #5<br>BaO | #6<br>$K_2O$ |
|---|---|---|---|---|---|---|
| $SiO_2$ | 62.54 | 65.54 | 64.38 | 62.54 | 66.74 | 62.54 |
| $Al_2O_3$ | 2.35 | 2.35 | 2.35 | 2.35 | 2.35 | 2.35 |
| $B_2O_3$ | 5.79 | 2.79 | 1.95 | 5.79 | 1.59 | 5.79 |
| $Li_2O$ | 0 | 0 | 0 | 0 | 0 | 0 |
| $Na_2O$ | 14.33 | 14.33 | 16.33 | 14.33 | 14.33 | 7.48 |
| $K_2O$ | 0.64 | 0.64 | 0.64 | 0.64 | 0.64 | 7.48 |
| MgO | 0 | 0 | 3.51 | 0 | 0 | 5.53 |
| CaO | 7.01 | 7.01 | 3.51 | 0 | 0 | 8.48 |
| SrO | 0.10 | 0.10 | 0.10 | 0.10 | 0.10 | 0.10 |
| BaO | 7.04 | 7.04 | 7.02 | 14.05 | 14.05 | 0.04 |
| ZnO | 0 | 0 | 0 | 0 | 0 | 0 |
| $TiO_2$ | 0.10 | 0.10 | 0.10 | 0.10 | 0.10 | 0.10 |
| $Fe_2O_3$ | 0.10 | 0.10 | 0.10 | 0.10 | 0.10 | 0.10 |
| CTE ($\times 10^{-6}$/C.) | 9.76 | 9.90 | 10.12 | 9.72 | 10.12 | 9.57 |
| Temperature (F.) for: | | | | | | |
| Log n = 3.0 | 1815 | 1926 | 1920 | 1785 | 1924 | 1991 |
| Liquidus | 1544 | 1520 | 1427 | 1774 | 1857 | 1817 |
| Advantages of additional component: | Higher CTE; Lower Liquidus; Lower Viscosity | Higher CTE; Lower Liquidus | Higher CTE; Lower Liquidus | Higher CTE; Lower Viscosity | Higher CTE; | Higher CTE; Higher Viscosity |

| Modification | #7<br>ZnO | #8<br>ZnO | #9<br>$TiO_2$ | #10<br>$TiO_2$ | #11<br>$Li_2O$ | #12<br>$Li_2O + ZnO$ |
|---|---|---|---|---|---|---|
| $SiO_2$ | 62.54 | 62.54 | 62.54 | 62.54 | 62.54 | 62.54 |
| $Al_2O_3$ | 2.35 | 2.35 | 2.35 | 2.35 | 2.35 | 2.35 |
| $B_2O_3$ | 5.79 | 5.79 | 5.79 | 5.79 | 5.79 | 5.79 |
| $Li_2O$ | 0 | 0 | 0 | 0 | 7.48 | 7.48 |
| $Na_2O$ | 14.33 | 14.33 | 14.33 | 14.33 | 7.48 | 7.48 |
| $K_2O$ | 0.64 | 0.64 | 0.64 | 0.64 | 0 | 0 |
| MgO | 3.51 | 0 | 3.51 | 0 | 5.53 | 3.51 |
| CaO | 3.51 | 0 | 3.51 | 0 | 8.48 | 3.51 |
| SrO | 0.10 | 0.10 | 0.10 | 0.10 | 0.10 | 0.10 |
| BaO | 0 | 0 | 0 | 0 | 0.04 | 0 |
| ZnO | 7.02 | 14.05 | 0 | 0 | 0 | 7.02 |
| $TiO_2$ | 0.10 | 0.10 | 7.12 | 14.15 | 0.10 | 0.10 |
| $Fe_2O_3$ | 0.10 | 0.10 | 0.10 | 0.10 | 0.10 | 0.10 |
| CTE ($\times 10^{-6}$/C.) | 8.74 | 8.64 | 8.33 | 8.09 | 8.19 | 7.84 |
| Temperature (F.) for: | | | | | | |
| Log n = 3.0 | 1947 | 1966 | 1918 | 1893 | 1829 | 1844 |
| Liquidus | 1509 | 1509 | 1765 | 1904 | 1848 | — |
| Advantages of additional component: | Lower Liquidus; Lower CTE | Lower Liquidus; Lower CTE | Lower CTE | Lower CTE | Lower CTE; Lower Viscosity | Lower CTE; Lower Viscosity |

| Modification | #13<br>$Li_2O + TiO_2$ | #14<br>$K_2O + BaO$ | #15<br>$K_2O + BaO$ | #16<br>BaO | #17<br>$K_2O + BaO$ | #18<br>$K_2O + BaO$ |
|---|---|---|---|---|---|---|
| $SiO_2$ | 62.54 | 55.32 | 62.54 | 61.80 | 61.80 | 58.47 |
| $Al_2O_3$ | 2.35 | 5.50 | 2.35 | 2.60 | 2.60 | 4.40 |
| $B_2O_3$ | 5.79 | 3.05 | 5.79 | 1.73 | 1.73 | 0 |
| $Li_2O$ | 7.48 | 0 | 0 | 0 | 0 | 0 |
| $Na_2O$ | 7.48 | 11.34 | 7.48 | 18.49 | 9.55 | 21.02 |
| $K_2O$ | 0 | 11.34 | 7.48 | 0.61 | 9.55 | 2.65 |
| MgO | 3.51 | 4.33 | 3.51 | 5.33 | 1.96 | 4.95 |
| CaO | 3.51 | 4.48 | 3.51 | 5.74 | 2.11 | 5.11 |
| SrO | 0.10 | 0 | 0.10 | 0 | 0 | 0 |
| BaO | 0 | 4.55 | 7.02 | 3.70 | 10.70 | 3.30 |
| ZnO | 0 | 0 | 0 | 0 | 0 | 0 |
| $TiO_2$ | 7.12 | 0.03 | 0.10 | 0 | 0 | 0.03 |
| $Fe_2O_3$ | 0.10 | 0.06 | 0.10 | 0 | 0 | 0.06 |
| CTE ($\times 10^{-6}$/C.) | 7.67 | 12.16 | 9.92 | 11.53 | 12.03 | 12.16 |
| Temperature (F.) for: | | | | | | |
| Log n = 3.0 | 1838 | 1904 | 1927 | 1907 | 1905 | 1921 |
| Liquidus | — | 1591 | 1348 | 1511 | 1564 | 1779 |
| Advantages of additional component: | Lower CTE; Lower Viscosity | High CTE; Lower Viscosity | High CTE; Lower Liquidus | High CTE; Lower Liquidus | High CTE; Lower Liquidus | High CTE |

| Modification | #19<br>$K_2O + BaO$ | #20<br>$Fe_2O_3$ | #21<br>ZnO | #22<br>$K_2O + ZnO$ | #23<br>$K_2O + ZnO$ | #24<br>$Li_2O$ | #25<br>ZnO |
|---|---|---|---|---|---|---|---|
| $SiO_2$ | 53.64 | 63.10 | 62.00 | 55.47 | 57.34 | 58.62 | 58.62 |
| $Al_2O_3$ | 6.60 | 2.68 | 1.76 | 4.40 | 4.40 | 3.17 | 3.17 |
| $B_2O_3$ | 3.63 | 0 | 0 | 4.00 | 0 | 18.08 | 18.08 |

| | | | | | | | |
|---|---|---|---|---|---|---|---|
| Li₂O | 0 | 0 | 0 | 0 | 0 | 3.00 | 0 |
| Na₂O | 11.34 | 19.73 | 22.34 | 11.34 | 23.30 | 3.30 | 6.30 |
| K₂O | 11.34 | 0.20 | 0.44 | 11.34 | 1.50 | 0.77 | 0.77 |
| MgO | 4.33 | 3.21 | 4.01 | 4.01 | 4.01 | 1.61 | 1.61 |
| CaO | 4.48 | 3.71 | 4.68 | 4.68 | 4.68 | 11.12 | 7.12 |
| SrO | 0 | 0 | 0 | 0 | 0 | 0.24 | 0.24 |
| BaO | 4.55 | 5.30 | 0 | 0 | 0 | 0 | 0 |
| ZnO | 0 | 0.05 | 4.68 | 4.68 | 4.68 | 0 | 4.00 |
| TiO₂ | 0.03 | 0.51 | 0.03 | 0.03 | 0.03 | 0.02 | 0.02 |
| Fe₂O₃ | 0.06 | 1.45 | 0.06 | 0.06 | 0.06 | 0.07 | 0.07 |
| CTE (×10⁻⁶/C.) | 12.08 | — | 11.52 | 12.22 | 12.05 | — | — |
| Temperature (F.) for: | | | | | | | |
| Log n = 3.0 | 1917 | 1919 | 1903 | 1894 | 1916 | 1909 | 1967 |
| Liquidus | 1741 | 1323 | 1572 | 1411 | 1773 | 1855 | 1627 |
| Advantages of additional component: | High CTE | Low Liquidus | Low Liquidus | High CTE; Lower Liquidus | High CTE | Low Viscosity | Low Liquidus |

| Modification | #26 Li₂O | #27 Li₂O + ZnO | #28 TiO₂ | #29 Li₂O + TiO₂ | #30 Li₂O + ZnO + TiO₂ | #31 BaO | #32 BaO |
|---|---|---|---|---|---|---|---|
| SiO₂ | 61.84 | 61.84 | 61.84 | 61.84 | 61.84 | 58.62 | 61.51 |
| Al₂O₃ | 2.72 | 2.72 | 2.72 | 2.72 | 2.72 | 3.17 | 2.50 |
| B₂O₃ | 14.08 | 14.08 | 14.08 | 14.08 | 14.08 | 18.08 | 20.00 |
| Li₂O | 2.85 | 4.50 | 0 | 3.00 | 4.50 | 0 | 0 |
| Na₂O | 6.21 | 4.56 | 9.06 | 6.06 | 4.56 | 6.30 | 4.90 |
| K₂O | 0.60 | 0.06 | 0.06 | 0.06 | 0.06 | 0.77 | 0 |
| MgO | 2.20 | 2.20 | 2.20 | 2.20 | 3.00 | 1.61 | 0 |
| CaO | 9.81 | 5.81 | 5.81 | 5.81 | 3.00 | 6.22 | 0 |
| SrO | 0 | 0 | 0 | 0 | 0 | 0.24 | 0 |
| BaO | 0 | 0 | 0 | 0 | 0 | 4.90 | 11.00 |
| ZnO | 0 | 4.00 | 0 | 0 | 3.00 | 0 | 0 |
| TiO₂ | 0.16 | 0.16 | 4.16 | 4.16 | 3.16 | 0.02 | 0.02 |
| Fe₂O₃ | 0.07 | 0.07 | 0.07 | 0.07 | 0.07 | 0.07 | 0.07 |
| CTE (×10⁻⁶/C.) | 6.88 | 5.68 | 6.37 | 6.02 | 5.45 | — | 5.70 |
| Temperature (F.) for: | | | | | | | |
| Log n = 3.0 | 1918 | 1935 | 1972 | 1943 | 1963 | 1914 | 1954 |
| Liquidus | 1896 | 1863 | 1828 | 1843 | 1818 | 1634 | 1829 |
| Advantages of additional component: | Low CTE | Low CTE | Low CTE | Low CTE | Low CTE | Low Liquidus | Low CTE |

EXAMPLE II

Irregular-shaped glass fibers of the present invention were produced using the low-expansion glass Control #1C and the high-expansion glass Example #14. Fibers were produced at approximately 40 pounds per hour in a pilot-scale operation. Test squares of the wool batts were then produced from 50 grams of the fibers in an 8×8 inch sample. The recovery of these test squares was measured by comparing the recovered thickness to the compressed thickness. The compression was for 15 minutes at 12 pcf (192 kg/m³).

A standard bindered insulation product of the prior art showed a recovery ratio of 18:1. Standard binderless wool insulating material of the prior art showed a recovery ratio of 14.4:1. In comparison, binderless irregularly shaped wool insulating material of the present invention showed a recovery of from 32:1 to 38:1 for the three samples tested.

We claim:

1. An irregularly shaped glass fiber suitable for insulation, comprising two distinct glasses, each glass having a different coefficient of thermal expansion (CTE) wherein the CTE's differ by at least 4.0 ppm/C, each glass having a different glass composition, each glass composition having a temperature for a log viscosity of 3 ranging from 1600 to 2050 F. (871 to 1121 C.) and a liquidus temperature at least 150 F. (66 C.) below the log viscosity of 3 temperature, each glass composition consisting essentially of $SiO_2$, $Al_2O_3$ and $Na_2O$, and including from 1.0 to 20.0 mole percent of at least one of BaO, SrO, $K_2O$, $Li_2O$, ZnO, $TiO_2$ and $Fe_2O_3$.

2. An irregularly shaped glass fiber according to claim 1, wherein the glass compositions include $B_2O_3$, MgO or CaO.

3. An irregularly shaped glass fiber according to claim 1, wherein each glass composition includes 2.0 to 10.0 mole percent of BaO, SrO, $K_2O$, $Li_2O$, ZnO or TiO2, or 1.0 to 5 mole percent $Fe_2O_3$.

4. An irregularly shaped glass fiber according to claim 1, wherein at least one glass composition includes $K_2O$ and BaO.

5. An irregularly shaped glass fiber according to claim 1, wherein at least one glass composition includes BaO.

6. An irregularly shaped glass fiber according to claim 1, wherein at least one glass composition includes $Li_2O$.

7. An irregularly shaped glass fiber according to claim 1, wherein at least one glass composition includes ZnO.

8. An irregularly shaped glass fiber according to claim 1, wherein at least one glass composition includes $K_2O$ and ZnO.

9. An irregularly shaped glass fiber according to claim 1, wherein at least one glass composition includes $TiO_2$.

10. An irregularly shaped glass fiber according to claim 1, wherein at least one glass composition includes $Fe_2O_3$.

11. Glass-fiber insulation comprising a collection of irregularly shaped glass fibers according to claim 1.

12. Glass-fiber insulation comprising a collection of irregularly shaped glass fibers according to claim 2.

13. Glass-fiber insulation comprising a collection of irregularly shaped glass fibers according to claim 3.

14. Glass-fiber insulation comprising a collection of irregularly shaped glass fibers according to claim 4.

15. Glass-fiber insulation comprising a collection of irregularly shaped glass fibers according to claim 5.

16. Glass-fiber insulation comprising a collection of irregularly shaped glass fibers according to claim 6.

* * * * *